United States Patent [19]

Propst

[11] 4,217,073
[45] Aug. 12, 1980

[54] MATERIAL HANDLING SYSTEM
[75] Inventor: Robert L. Propst, Ann Arbor, Mich.
[73] Assignee: Herman Miller, Inc., Zeeland, Mich.
[21] Appl. No.: 903,248
[22] Filed: May 5, 1978
[51] Int. Cl.[2] .......................... B65G 3/10; B65D 91/00
[52] U.S. Cl. ...................................... 414/421; 220/1 T; 220/331; 232/43.1; 232/43.5; 248/129; 280/79.2; 414/572
[58] Field of Search ................... 414/13, 349, 414, 421, 414/498, 495, 572; 220/1 T, 262, 263, 331; 232/43.1, 43.5; 248/129, 130, 139; 280/79.2, 47.34

[56] References Cited
U.S. PATENT DOCUMENTS

| 3,075,692 | 1/1963 | Lumley | 232/43.1 X |
|---|---|---|---|
| 3,198,395 | 8/1965 | McKinney | 248/139 X |
| 3,719,296 | 3/1973 | Larson | 294/69 R |

*Primary Examiner*—Robert G. Sheridan
*Attorney, Agent, or Firm*—Olsen and Stephenson

[57] ABSTRACT

A down flow material handling system consisting of an upright box-like container, a generally L-shape frame having an upright portion on which the upper end of the container is suspended and a generally horizontal base portion which extends underneath the container, and a transport cart. The container has an inlet opening at its upper end and a discharge door at its lower end which is hingedly mounted on the container rear wall and is releasably maintained in a closed position by the base portion of the L-shape frame. The cart is operable to remove the container from a wall support on which it is normally hung, move the container to a discharge location, and support the container during pivotal movement thereof to a discharge position in which the discharge door is clear of the L-shape frame and moves downwardly to an open position under the weight of the contents of the container.

10 Claims, 7 Drawing Figures

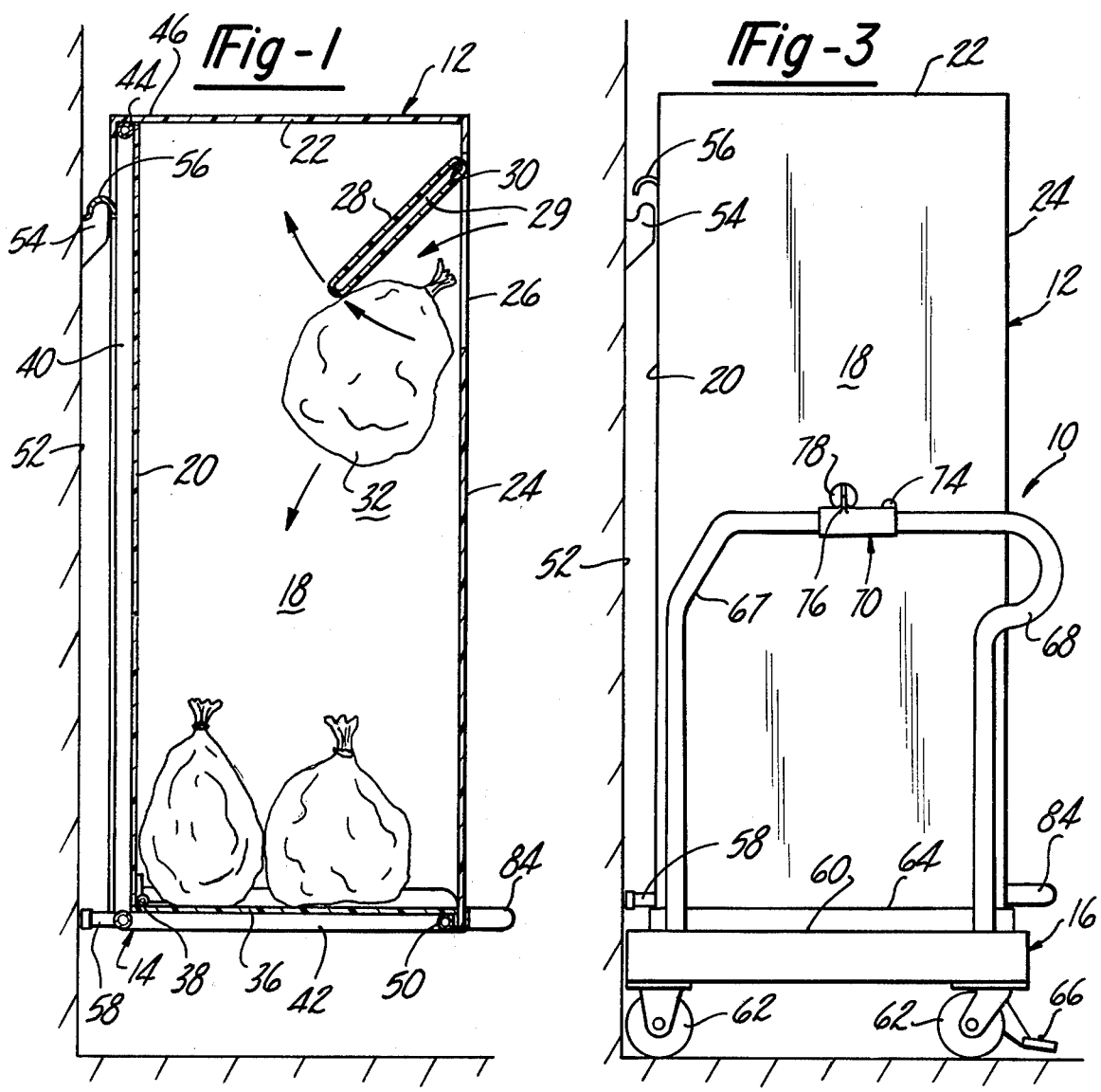
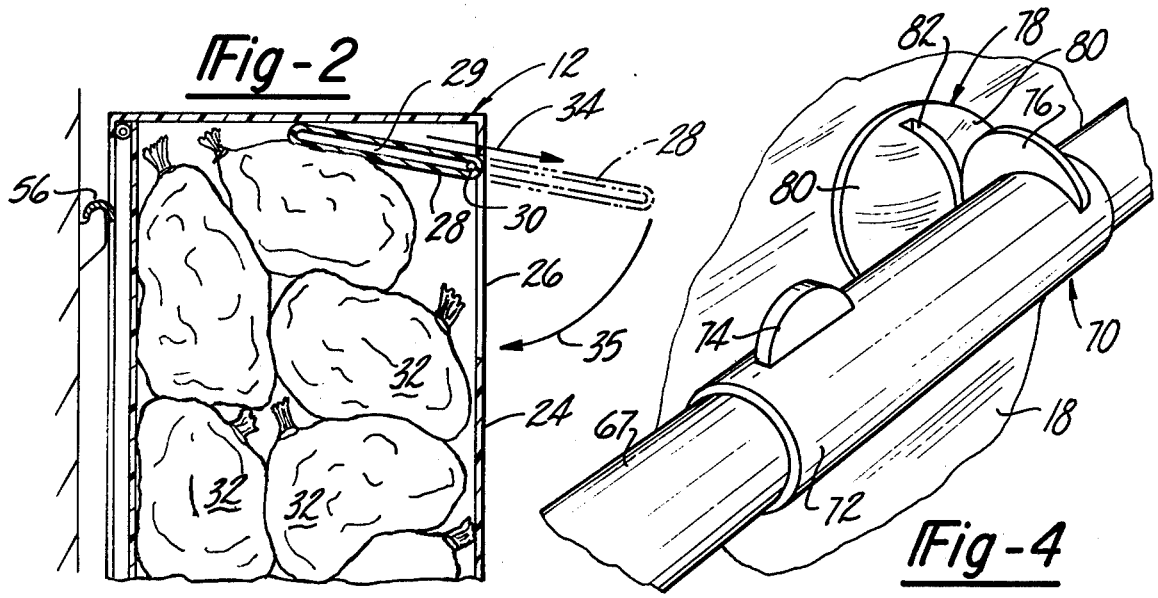

MATERIAL HANDLING SYSTEM

BACKGROUND OF THE INVENTION

This invention relates generally to the field of material handling systems and more particularly to a system for efficiently handling material such as soiled linen in a hospital. In systems of this type, a minimum of manual handling of the material is desired and it is also desirable that the material be handled a minimum number of times between the time it is discarded and the time it reaches the point where it is to be washed or otherwise processed. Systems of this type have long been sought, but have heretofore either been unavailable or the cost has been prohibitive. The principal object of this invention, therefore, is to provide an improved system of this type which is a totally down flow system, thereby avoiding the problems of moving the material against the force of gravity, and which enables the container for the discarded material to be readily moved from the point at which it is filled to the point at which it is discharged.

SUMMARY OF THE INVENTION

A material handling system consisting of an upright container, a supporting frame for the container, and a transport cart for the frame with the container supported thereon. The container consists of an upright box-shape hollow body having side walls, a front wall, a rear wall, and a top wall, with an inlet opening for the body being formed in the front wall at a position adjacent the upper end of the body. A discharge door is hinged on the lower end of the body at a position such that when the door is in its closed position it forms a bottom wall for the body, and when the door is hinged downwardly to an open position it allows material in the body to be discharged therefrom through the open bottom end of the body. The frame consists of a generally L-shape support frame having its upper end engaged with the container body so that the container is hung on the frame in a position in which the base portion of the frame holds the container door in a closed position. A hook on the upright portion of the frame enables the frame and container combination to be hung on a suitable support such as a wall bracket.

The transport cart consists of a wheeled deck on which upright side frame members are mounted in positions in which the side frame members will be disposed on opposite sides of the container when the cart is moved to a position underneath the wall-supported container preparatory to removing the container from the wall. A vertically movable platform on the deck is movable upwardly into engagement with the base portion of the container support frame and this movement is continued until the container is moved into a clearance relation with the wall support.

The side frame members restrain the container against side to side movement on the platform. Container locking assemblies that are rotatably mounted on the side frame members include stops that are movable into interfitting engagement with stop units on the side walls of the container in the lowered position of the container on the cart. This engagement of the stops restrains the container against fore and aft movement on the cart.

The resulting system thus enables the efficient handling of material from point of deposit to point of disposal.

Further objects, features, and advantages of this invention will become apparent from a consideration of the following description when taken in connection with the appended claims and the accompanying drawing in which:

FIG. 1 is a vertical sectional view of the container and frame combination in the system of this invention showing the frame suspended from a wall bracket and being filled with material;

FIG. 2 is a fragmentary vertical sectional view of the structure shown in FIG. 1 showing the container completely filled with material;

FIG. 3 is a side elevational view of the system of this invention showing the container and frame combination supported on a transport cart and lifted off the wall bracket;

FIG. 4 is a fragmentary detail perspective view of the container locking structure in the system of this invention;

Figure 5:
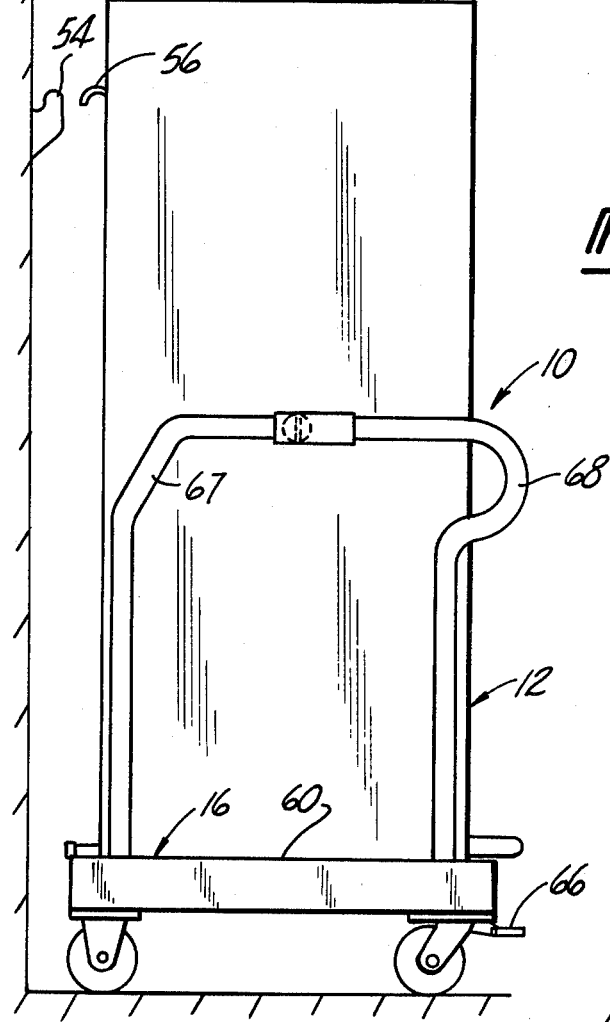
FIG. 5 is a side elevational view of the system of this invention, illustrated similarly to FIG. 3, showing the container and the transport cart in clearance positions relative to the wall bracket.

With reference to the drawing, the system of this invention, indicated generally at 10, is illustrated in FIGS. 1 and 3 as including an upright generally box-shape hollow container 12, a generally L-shape tubular frame 14 on which the container 12 is supported, and a wheeled transport cart 16 operable to move the container 12 from one point to another. As shown in FIGS. 1 and 3, the container 12 has side walls 18, a rear wall 20, a top wall 22 and a front wall 24.

An inlet opening 26 is formed in the front wall 24 adjacent the upper end thereof and a door 28 is mounted on the front wall 24 for closing the opening 26. As shown in FIGS. 1 and 2, the door 28 is supported on a hinge pin 30 which is carried on the front wall 24 and extends transversely of the door 28. The door 28 is formed with a slot 29 which extends from edge to edge and end to end thereof and has the pin 30 disposed therein. As a result, when the container 12 is filled, such as with sacks 32 of soiled linen illustrated in FIG. 2, and the material 32 is in the path of normal downward pivotal closing movement of the door 28, the door can be moved in the direction of the arrow 34 in FIG. 2 to the broken line position in which the door extends out of the container 12 for subsequent downward pivotal movement in the direction of the arrow 35 to a position closing the opening 26. In such position, the end of the door which forms the lower end in the FIG. 1 position of the door is now the upper end of the door.

The lower end of the container 12 is normally closed by a discharge door 36 which is secured at its rear end to a hinge 38 secured to the container back wall 20. When the container 12 is being filled, the door 36 is maintained in the closed horizontal position illustrated in FIG. 1 in which the door 36 forms the floor of the container 12.

The L-shape container support frame 14 has an upright portion 40 (FIGS. 1 and 6) and a generally horizontal base portion 42 which extends underneath the container 12 in the filling position of the container 12 shown in FIG. 1. At its upper end 44, the frame 14 engages the underside of a rearwardly extending lip or flange 46 on the container 12. The result is a pivotal support of the upper end of the container 12 on the upper end 44 of the frame 14. As shown in FIG. 1, when the frame 14 is in a position supporting the upper end of the container 12, the frame base portion 42 is in a position in which it engages the door 36 and maintains the door 36 in the closed position shown in FIG. 1. The base portion 42 is large enough to extend over the entire length of the door 36 so that the terminal end portion 50 of the base portion 42 is located at the free end of the door 36 and close to the front wall 24. The engagement of the frame 14 with substantially the entire length of the door 36, including the forward or free end of door 36, prevents the weight of the container contents on the door from bending the door 36 open.

Figure 6:
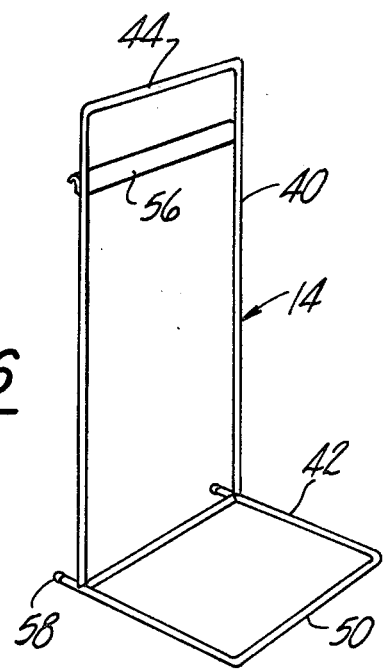
FIG. 6 is a perspective view of the container support frame in the system of this invention.

It is intended that the container 12 be hung from a wall or similar support, such as the one indicated at 52 in FIGS. 1, 2, and 3, provided with a hanging bracket 54. As shown in FIG. 6, the frame 14 is provided adjacent its upper end 44 with a hook member 56 and the hook 56 is readily hooked over the hanging bracket 54 so as to suspend the frame 40 from the bracket 54. In order to maintain the frame portion 40 in a vertical position when so suspended, the base portion 42 is provided with rearwardly extending extensions 58 which engage the wall 52.

The transport cart 16, similar to the cart shown in U.S. Pat. No. 3,550,908, owned by the assignee of this application, consists of a deck 60 supported on ground wheels 62 and having a vertically movable surface or platform 64 mounted thereon for movement between the elevated position shown in FIG. 3 and the lowered position shown in FIG. 5 in which the platform 64 is flush with the deck 60. A foot operated pedal 66 is operable to move the platform 64 between the upper and lower positions shown in FIGS. 3 and 5, respectively.

The cart 16 is also provided with upright frame members 67 which are spaced a distance apart slightly greater than the width of the container 12. As a result, in the wall hung position of the container 12 shown in FIG. 1, the cart 16 can be moved to a position in which the deck 60 is below the frame 14 and the frame members 67 are on opposite sides of the container 12. To facilitate manual manipulation of the cart 16, the frame members 67 are provided with forwardly extending arcuate handle sections 68.

In operation of the system 10, assume that the container 12 is in its wall hung position shown in FIG. 1. Further assume that the container 12 has been filled with the material 32 which it is intended to contain, as shown in FIG. 2, and that it is desired to empty the container 12 by discharging the contents thereof at a desired point remote from the wall hung location of the container 12 in which it has been filled. The cart 16 is manually grasped by the handles 68 and moved to a position in which the deck 60 is below the container 12 and the side frame members 67 are disposed on transversly opposite sides of the container 12. The foot pedal 66 is then manually depressed so as to raise the platform 64 into engagement with the frame base portion 42 to in turn move the container 12 and the frame 14 upwardly to a position in which the hook 56 is located above the wall bracket 54, as illustrated in FIG. 3.

The cart 16 is then manually moved away from the wall 52 to a position in which the hook 56 is in a clearance relation with the wall bracket 54. The foot pedal 66 is then manipulated so as to lower the platform 64 to its lowered position shown in FIG. 5 substantially flush with the deck 60. In the supported position of the container 12 on the deck 60, shown in FIG. 5, the side frame members 67 restrain the container 12 against side-to-side movement on the cart 16. A pair of locking sleeve assemblies 70 are provided on a side frame members 67 for restraining the container 12 against fore and aft movement on the cart 16.

Figure 7:
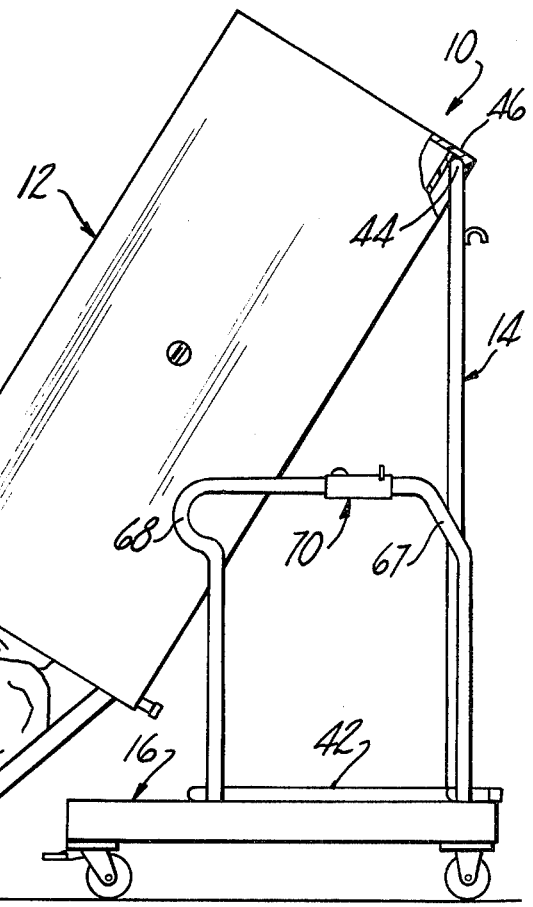
FIG. 7 is a side elevational view of the system of this invention showing the container in a discharge position.

The sleeve assemblies 70 are identical, each consisting of a tubular member 72 rotatably mounted on the frame member 67 and provided with a thumb-actuating projection 74 (FIG. 4). Each tubular member 72 also has a plate shape stop member 76 extending generally radially therefrom. The side walls 18 of the container 12 are provided with transversely extending stop assemblies 78 (FIGS. 3 and 7). Each assembly 78 has a pair of spaced-apart stop portions 80, which are of arcuate curved shape and have a space 82 therebetween at least as wide as the width of a stop member 76.

In order to lock the container 12 on the cart 16, the sleeve assemblies 70 are moved on the frame members 67 to positions in which the stop members 76 are aligned with the spaces 82 and the sleeve members 72 are then rotated to position the stops 76 within the spaces 82. In these positions, the stops 76 and 80 coact to preclude movement of the container 12 fore and aft on the cart 16. In the alternative, the stops 76 can be cammed along either of the arcuate stops 80 to positions aligned with the spaces 82 in which position the stops 76 will snap into the spaces 82, the springiness in frame members 67 allowing the stops 76 to move in and out relative to the container 12.

As shown in FIG. 3, in the elevated position of the container 12 the stop assemblies 78 are slightly above the locking sleeve assemblies 70 while in the lowered position of the platform 64, the stop assemblies 78 are generally aligned with the sleeve assemblies 70.

With the sleeve assemblies 70 in the locking positions illustrated in FIG. 5, the cart 16 can be manually manipulated to move the container 12 to a desired location for discharge of the contents thereof, with the container 12 securely locked on the cart 16. At the desired discharge point, the sleeve assemblies 70 are moved to positions releasing the container 12 for fore-and-aft movement, as shown in FIG. 7, and a handle 84 on the lower end of the front wall 24 of the container 12 is manually grasped and the container 12 is swung upwardly and forwardly about the upper end 44 of the frame 14 to a position in which the discharge door 36 is in a clearance relation with the frame 14 and the cart 16. The weight of the material 32 within the container 12 will then force the discharge door 36 to swing downwardly to the open position shown in FIG. 7 in which the container contents 32 readily fall out of the container 12.

Once the container 12 has been emptied, it is moved in a reverse sequence from the FIG. 7 position to the position shown in FIG. 5 adjacent the wall 52. The platform 64 is then moved upwardly to elevate the hook 56 to a position above the wall hanger 54, and the cart 16 is moved toward the wall 52 to the position shown in FIG. 3. The platform 64 is then moved downwardly so as to suspend the container 12 and the frame 14 on the hook 56 as shown in FIG. 1. The empty container 12 is then in condition for receiving material 32 through the inlet opening 26 as shown in FIG. 1.

From the above description it is seen that this invention provides a material-handling system 10 in which the material to be handled, indicated at 32, flows downwardly from the point where it enters the container 12, shown in FIG. 1, to the point where it is discharged from the container 12 (FIG. 7). In the system 10, manual handling of the material 32 is avoided and it is only necessary to lift the material 32 the short distance necessary to disengage the hook 56 from the wall hanger 54. This is readily accomplished with the transport cart 16 which also operable to quickly move the container 12 from its fill position shown in FIG. 1 to the discharge position shown in FIG. 7.

What is claimed is:

1. A container comprising an upright hollow body having side walls, a front wall, a rear wall, and a top wall, means on said body providing an inlet opening at the upper end thereof, and a discharge door movably mounted on the lower end of said body for movement between closed and open positions, said door in the closed position thereof forming a bottom wall for said body and in the open position thereof allowing material in said body to discharge therefrom through the bottom end thereof, a generally L-shape support frame for supporting said container and having an upright portion and a base portion, and coacting means on said container and on said upright portion for pivotally supporting said container on said frame for movement between a position in which said base portion is engaged with said door so as to retain said door in a closed position and a position in which said door is in a clearance relation with said base portion so as to be movable to an open position.

2. The container according to claim 1 wherein said coacting means includes a rearwardly extending flange at the upper end of said rear wall, said upright portion being arranged in a supporting relation with said flange to support said container on said support frame.

3. The container according to claim 1 wherein said inlet opening is located in said front wall and further including a door adapted to close said opening, hinge pin means on said front wall pivotally supporting said door on said front wall, said door including slot means therein extending from end to end thereof and having said hinge pin means disposed therein to enable said door to be suspended from either end on said hinge pin means.

4. The container according to claim 1 wherein said discharge door is hingedly mounted on said rear wall at the lower end thereof for downward pivoting movement from a substantial horizontal closed position to a downwardly extending open position, and wherein said frame base portion engages said discharge door at a position adjacent said front wall so as to maintain said door in said closed position.

5. The container according to claim 1 and further including means for hanging said frame.

6. A material handling system comprising an upright hollow material container having an upper end and a lower end, support means adjacent the upper end of said container, said container having an inlet opening adjacent the upper end thereof, a door member hingedly mounted on the lower end of said container for downward hinging movement to an open position in which material can flow downwardly out of said container, said door member being hingedly movable upwardly to a closed position at the lower end of said container in which position said door member forms a material support floor at the lower end of said container, a support frame having an upright portion engageable with said support means so as to support said container thereon and a horizontal base portion located below said door member, and a transport cart having a vertically movable platform portion engageable with said base portion and operable to raise and lower said frame with said container thereon.

7. The system according to claim 6 further including suspension means on said upright portion of said support frame operable to suspend said frame in a position in which said container is supported on the upper end of said upright frame portion and the base portion of said frame engages said door member so as to maintain the door member in said closed position.

8. The system according to claim 7 further including handle means on said container adjacent the lower end thereof enabling upward pivotal movement of the container about said upper end of the upright frame portion to a position in which said door member is in a clearance relation with said frame base portion for movement to said open position in which material in said container can flow downwardly out of the container.

9. The system according to claim 6 further including side frame members mounted in fixed positions on said cart, on opposite sides of said container for restraining said container against side-to-side movement on said cart, and coacting means on said side frame members and said container engageable in a lowered position of said platform and operable when engaged to restrain said container against fore-and-aft movement on said cart.

10. The system according to claim 9 wherein said coacting means comprises stop means on at least one side of said container, a sleeve rotatably supported on at least the side frame member on said one side of said container, said sleeve having a stop member thereon movable into interfitting engagement with said stop means in rotated position of said sleeve.

* * * * *